United States Patent
Ryan

(10) Patent No.: US 8,413,444 B2
(45) Date of Patent: Apr. 9, 2013

(54) SELF-CONTAINED OIL FEED HEAT SHIELD FOR A GAS TURBINE ENGINE

(75) Inventor: William R. Ryan, Oviedo, FL (US)

(73) Assignee: Siemens Energy, Inc., Orlando, FL (US)

( * ) Notice: Subject to any disclaimer, the term of this patent is extended or adjusted under 35 U.S.C. 154(b) by 774 days.

(21) Appl. No.: 12/555,117

(22) Filed: Sep. 8, 2009

(65) Prior Publication Data

US 2011/0056204 A1  Mar. 10, 2011

(51) Int. Cl.
*F02C 1/00* (2006.01)

(52) U.S. Cl. .......................................... 60/734

(58) Field of Classification Search .................... 60/734, 60/739–740, 742, 746–748; 239/132, 139, 239/288, 288.3, 533.2
See application file for complete search history.

(56) References Cited

U.S. PATENT DOCUMENTS

| | | | | |
|---|---|---|---|---|
| 4,185,462 A * | 1/1980 | Morse et al. | ..................... | 60/761 |
| 5,261,240 A * | 11/1993 | Oyler et al. | ..................... | 60/734 |
| 6,688,534 B2 * | 2/2004 | Bretz | .................. | 239/8 |
| 6,775,984 B2 * | 8/2004 | Lavie et al. | ..................... | 60/740 |
| 7,762,279 B2 * | 7/2010 | Zeiber et al. | ............. | 137/614.05 |
| 8,033,113 B2 * | 10/2011 | Patel et al. | ....................... | 60/742 |
| 8,122,721 B2 * | 2/2012 | Johnson et al. | .................. | 60/742 |
| 2005/0005610 A1 * | 1/2005 | Belsom et al. | .................. | 60/796 |
| 2006/0026966 A1 | 2/2006 | Moraes | | |
| 2006/0218925 A1 * | 10/2006 | Prociw et al. | .................... | 60/739 |
| 2007/0163263 A1 * | 7/2007 | Thomson | ........................ | 60/773 |
| 2008/0098737 A1 * | 5/2008 | Haggerty et al. | ............... | 60/740 |
| 2009/0044538 A1 * | 2/2009 | Pelletier et al. | ................. | 60/740 |
| 2009/0140073 A1 | 6/2009 | Thomson et al. | | |
| 2009/0211256 A1 | 8/2009 | Williams | | |
| 2010/0307161 A1 * | 12/2010 | Thomson et al. | ............... | 60/748 |

FOREIGN PATENT DOCUMENTS

| | | |
|---|---|---|
| GB | 2120524 A | 2/1983 |
| JP | 2006138566 A | 6/2006 |
| WO | 9922176 A1 | 5/1999 |
| WO | 2009055045 A2 | 4/2009 |

* cited by examiner

*Primary Examiner* — Phutthiwat Wongwian

(57) ABSTRACT

A gas turbine engine fuel heat shield configured to shield fuel from high temperatures of surrounding turbine components to prevent coking of the fuel is disclosed. The gas turbine engine fuel heat shield may be formed from a generally elongated member having a first collar at a first end and a second collar at a second end opposite to the first end. One or more recesses may be positioned in an outer surface of the generally elongated member between the first and second collars. A sleeve is positioned around the generally elongated member and radially outward of the recess to form one or more sealed chambers. The sleeve may be sealed to prevent fuel from entering the recess and coking. Such design, therefore, prevents the formation of carbon particles from the fuel that could clog the fuel injectors.

14 Claims, 2 Drawing Sheets

SELF-CONTAINED OIL FEED HEAT SHIELD FOR A GAS TURBINE ENGINE

FIELD OF THE INVENTION

This invention is directed generally to gas turbine engines, and more particularly to cooling systems in hollow turbine airfoils.

BACKGROUND

In order to achieve low $NO_x$ levels that are required by regulation, gas turbine combustion designs rely on lean, premixed combustor designs to reduce flame temperatures. Typically, in order to achieve the best mixing possible, fuel is injected through a plurality of orifices situated so as to inject the fuel into the incoming combustion air. These injection orifices are joined by manifolds internal to the burner structure. A similar approach is also used for liquid fuels such that a large number of injection points interconnect through an internal manifold. Liquid fuel is delivered to the internal manifold via a single feed tube. Combustion air temperature in a gas turbine is typically between 400-500° C., while the liquid fuel temperature is typically less than 50° C. Hence, during liquid fuel operation, thermal stresses within the burner structure are typically quite high, especially in the region of the fuel feed tube. The problem of high stresses in the region of the fuel feed tube is typically exacerbated by the presence of the gas manifolds, which further increase stress. Quite often, the life limiting condition of the burner is related to the operational condition where oil operation is initiated by purging the oil passages with water.

In order to account for the high combustion temperature, thermally sensitive fuel feed conduits have been developed that have outer gaps. However, the gaps often fill with liquid fuel, which has a high conductivity, thereby reducing the insulation capacity of the fuel feed conduits. Additionally, the fuel that enters the gaps is very susceptible to coking, which is the formation of carbon particles. Coking can cause clogging of the fuel injection nozzles if the particles are carried downstream. Thus, a need exists for an improved insulation system for fuel feed conduits of gas turbine engines.

SUMMARY OF THE INVENTION

This invention relates to a gas turbine engine fuel heat shield configured to insulate fuel being fed to a gas turbine engine from the heat of surrounding components. The heat shield insulates the fuel flowing through the heat shield to prevent coking of the fuel. The heat shield may be formed from an elongated member having one or more insulating chambers positioned immediately radially outward of the elongated member to insulate the fuel flowing through the elongated member. In at least one embodiment, the heat shield may be cylindrical.

In particular, the gas turbine engine fuel heat shield may be formed from a gas turbine engine fuel heat shield body formed from a generally elongated member having one or more first collars at a first end and one or more second collars at a second end opposite to the first end. One or more recesses may be positioned in an outer surface of the generally elongated member between the first and second collars. A sleeve may be positioned around the generally elongated member and radially outward of one or more recesses to form one or more sealed chambers. The sleeve may be sealed to prevent fuel from entering the recess and coking. Such design, therefore, prevents the formation of damaging carbon particles.

The gas turbine engine fuel heat shield may be formed from a gas turbine engine fuel heat shield body that is formed from a generally elongated member having at least one first collar at a first end and at least one second collar at a second end opposite to the first end. The at least one first collar may extend radially outward beyond outer surfaces of other portions of the gas turbine engine fuel heat shield body. At least one recess may be positioned in an outer surface of the generally elongated member between the at least one first collar and the at least one second collar. A sleeve may be positioned around the generally elongated member and radially outward of the at least one recess to form at least one chamber between the generally elongated member and the sleeve.

The sleeve may be positioned around the generally elongated member and may form at least one sealed chamber between the generally elongated member and the sleeve. A first standoff member may be positioned between the at least one first collar and the at least one second collar. The sleeve may contact the first standoff member and the at least one second collar. In one embodiment, the sleeve may be sealed to the first standoff member and may be sealed to the at least one second collar. The sleeve may extend from the first standoff member to the second end at that at least one second collar. One or more seals may be positioned at an end surface of the generally elongated member. In one embodiment, the seal may be a C-seal.

At least one intermediary standoff member may be positioned between the at least one first collar and the at least one second collar. In another embodiment, the at least one intermediary standoff member may be positioned between a first standoff member and the at least one second collar. The at least one intermediary standoff member may be generally cylindrical or have another appropriate configuration. The generally elongated member, the at least one first collar and the at least one second collar may also be generally cylindrical.

An advantage of this invention is that the heat shield reduces the thermal shock experienced at the onset of a water purge cycle.

Another advantage of this invention is that the heat shield includes a self-contained chamber that reduces the thermal shock.

Yet another advantage of this invention is that the heat shield is a two piece construction formed from the sleeve being positioned over top of the body, which enables the self-contained chamber to be sealed to prevent the chamber from being filled with liquid fuel during operation.

The heat shield having sealed self-contained outer chambers has two advantages including: that coke does not form in the insulating volume upon shutdown of the engine and that the heat shield does not lose insulating properties during operation due to being filled with liquid rather than air.

These and other embodiments are described in more detail below.

BRIEF DESCRIPTION OF THE DRAWINGS

The accompanying drawings, which are incorporated in and form a part of the specification, illustrate embodiments of the presently disclosed invention and, together with the description, disclose the principles of the invention.

DETAILED DESCRIPTION OF THE INVENTION

Figure 1:
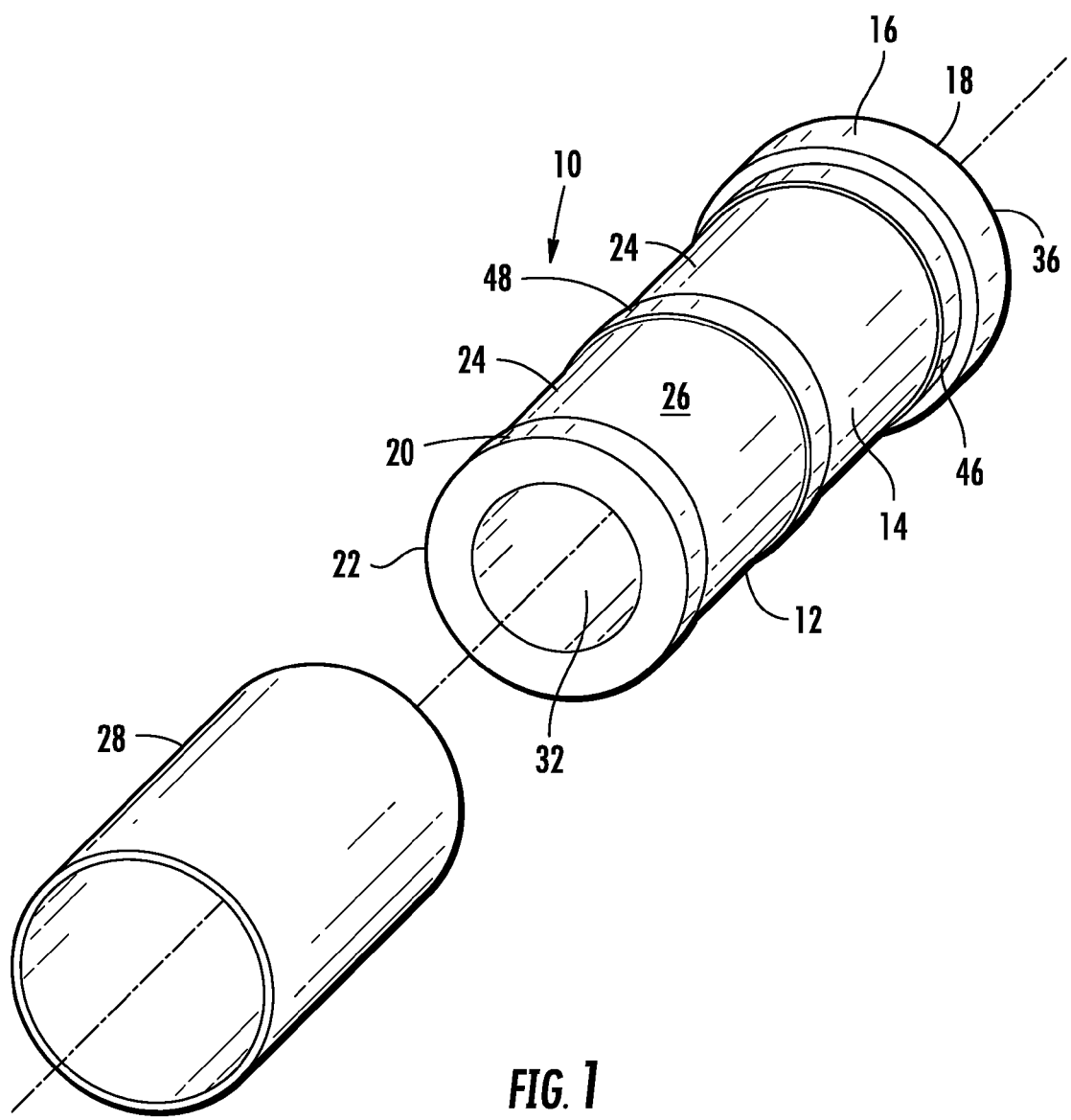
FIG. 1 is an exploded perspective view of a gas turbine engine fuel heat shield having features according to the invention.
Figure 2:
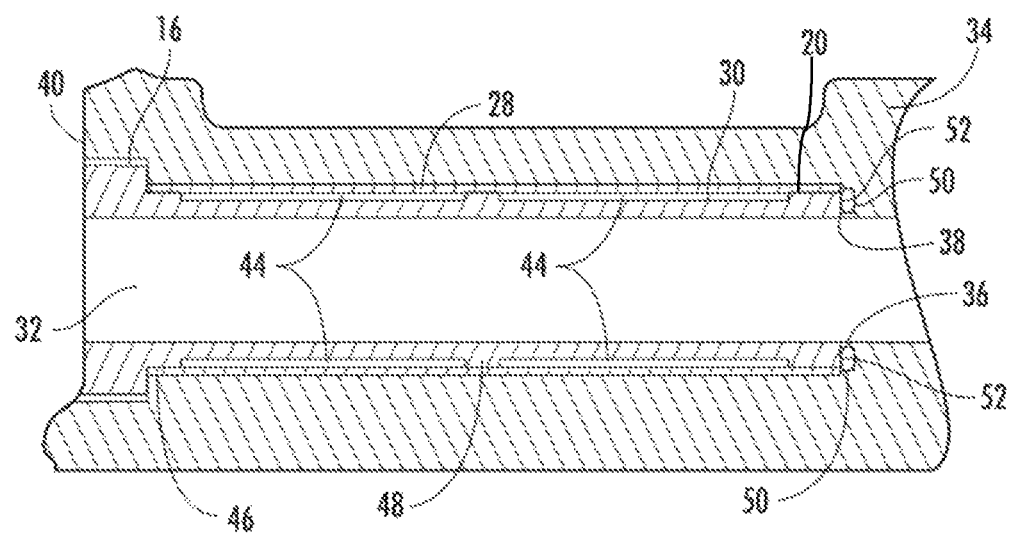
FIG. 2 is a cross-sectional view of the gas turbine engine fuel heat shield shown in FIG. 1 and in an installed condition.

As shown in FIGS. 1-2, this invention is directed to a gas turbine engine fuel heat shield 10 configured to insulate fuel being fed to a gas turbine engine from the heat of surrounding components to prevent coking. The gas turbine engine fuel heat shield 10 may be formed from a gas turbine engine fuel heat shield body 12 formed from a generally elongated member 14 having one or more first collars 16 at a first end 18 and one or more second collars 20 at a second end 22 opposite to the first end 18. One or more recesses 24 may be positioned in an outer surface 26 of the generally elongated member 14 between the first and second collars 16, 20. A sleeve 28 may be positioned around the generally elongated member 14 and radially outward of the one or more recesses 24 to form one or more sealed chambers 44. The sleeve 28 is sealed to prevent fuel from entering the recess 24 and coking. Such design, therefore, prevents the formation of damaging carbon particles from the fuel.

The generally elongated member 14 may form the gas turbine engine fuel heat shield 10. The generally elongated member 14 may have any appropriate configuration. In one embodiment, the generally elongated member 14 may be cylindrical with an internal cavity 32 configured to direct fuel through the member 14. The generally elongated member 14 may include a first collar 16 that may extend radially outward beyond outer surfaces 26 of other portions of the gas turbine engine fuel heat shield body 12. The first collar 16 may be configured to be countersunk in a component 34 of the gas turbine engine. The first collar 16 may be configured such that the first end 18 is flush with a surface 40 of the gas turbine engine component 34 while an opposite surface 36 of the first collar 16 bears against a surface 38 of the component 34. The first collar 16 may extend partially or completely around the gas turbine engine fuel heat shield body 12. The first collar 16 may be generally cylindrical or have any other appropriate configuration. The first collar 16 may extend along the length of the generally elongated member 14 a sufficient distance to provide support to the generally elongated member 14. In at least one embodiment, the first collar 16 may extend a distance of between about ½ to about ⅕₀ of the length of the generally elongated member 14 or other appropriate distance.

The second collar 20 may be positioned at the second end 22. The second collar 20 may extend radially outward further than some other portions of the generally elongated member 14. In at least one embodiment, the second collar 20 may not extend radially outward as far as the first collar 16. The second collar 20 may extend partially or completely around the gas turbine engine fuel heat shield body 12. The second collar 20 may be generally cylindrical or have any other appropriate configuration. The second collar 20 may extend along the length of the generally elongated member 14 a sufficient distance to provide support to the generally elongated member 14. In at least one embodiment, the second collar 20 may extend a distance of between about ½ to about ⅟₁₀ of the length of the generally elongated member 14 or other appropriate distance. As many second collars 20 as necessary may be included for support.

The generally elongated member 14 may include one or more recesses 24 in an outer surface 26 of the generally elongated member 14 between the first collar 16 and the second collar 20. The recess 24 may extend partially or entirely around the generally elongated member 14. The recesses 24 may extend any appropriate distance into the generally elongated member 14. The recesses 24 provide an insulation air pocket around the generally elongated member 14 through which conduction is limited. The recesses 24 may have a generally linear surface or may be irregular.

A sleeve 28 may be positioned around the generally elongated member 14 and radially outward of the recess 24 to form one or more chambers 44 between the generally elongated member 14 and the sleeve 28. The chambers 44 may have any appropriate configuration, as defined by the sleeve 28 and the recesses 24. The sleeve 28 may be formed from any appropriate material. The sleeve 28 may be configured to match the generally elongated member 14. In particular, the sleeve 28 may be sized such that an inner surface of the sleeve 28 contacts the outer surface of the generally elongated member 14 at support points, such as the second collar 20 and a first standoff member 46. The second collar 20 and the first standoff member 46 may protrude radially outward further than the recesses 24. The first standoff member 46 may be positioned in contact with the first collar. The sleeve 28 may extend from contacting the first collar 16 to the second collar at the second end 22 such that the sleeve 28 terminates at the second end 22. In one embodiment, the sleeve 28 may be in contact and sealed to the second collar 20 and the first standoff member 46.

One or more intermediary standoffs 48 may be positioned on the outer surface 26 of the generally elongated member 14. The intermediary standoff 48 may extend radially outward a distance equal to or different from the second collar 20 and the first standoff member 46. The intermediary standoff 48 may extend partially or completely around the generally elongated member 14. The intermediary standoff 48 may be generally cylindrical or have another appropriate configuration. There may be one or more rows of intermediary standoffs 48 positioned along the length of the sleeve 28 to support the sleeve 28. It is desirable to use as few intermediary standoffs 48 as possible to limit the amount of conduction between the sleeve 28 and the generally elongated member 14 forming the gas turbine engine fuel heat shield body 12.

As shown in FIG. 2, the gas turbine engine fuel heat shield 10 may be inserted into a cavity 32 in the gas turbine component 34 such that the gas turbine engine fuel heat shield 10 is adequately supported therein. The sleeve 28 may form a sealed chamber 44 between the sleeve 28 and the generally elongated member 14. The gas turbine engine fuel heat shield 10 may also include a seal 50 positioned on an axial surface 52 at the second end 22. In at least one embodiment, the seal 50 may be a C-seal or other appropriate seal. When the gas turbine engine fuel heat shield 10 is inserted into the cavity 32, the axial surface 52 is pressed against the seal 50, which is in turn pressed against the gas turbine component 34 to prevent fuel from entering the recesses 24 forming the sealed chamber 44.

The foregoing is provided for purposes of illustrating, explaining, and describing embodiments of this invention. Modifications and adaptations to these embodiments will be apparent to those skilled in the art and may be made without departing from the scope or spirit of this invention.

I claim:
1. A gas turbine engine fuel heat shield, comprising:
a gas turbine engine fuel heat shield body formed from a generally elongated member having a first collar at a first end and a second collar at a second end opposite to the first end, wherein the first collar extends radially outward beyond outer surfaces of other portions of the gas turbine engine fuel heat shield body;

at least one recess in an outer surface of the generally elongated member between the first collar and the second collar;

a sleeve positioned around the generally elongated member and radially outward of the at least one recess to form at least one chamber between the generally elongated member and the sleeve;

a first standoff member in contact with the first collar and positioned between the first collar and the second collar;

wherein the sleeve extends from the first standoff member to the second end at the second collar; and at least one seal in contact with an axial surface at the second end of the generally elongated member, which is at an opposite end from the first collar at the first end, and in contact with the sleeve to seal the sleeve to the generally elongated member within a cavity in a turbine component.

2. The gas turbine engine fuel heat shield of claim 1, wherein the sleeve positioned around the generally elongated member forms at least one sealed chamber between the generally elongated member and the sleeve.

3. The gas turbine engine fuel heat shield of claim 1, wherein the sleeve is sealed to the first standoff member and is sealed to the second collar.

4. The gas turbine engine fuel heat shield of claim 1, further comprising an intermediary standoff member positioned between the first collar and the second collar.

5. The gas turbine engine fuel heat shield of claim 4, wherein the intermediary standoff member is positioned between the first standoff member and the second collar.

6. The gas turbine engine fuel heat shield of claim 5, wherein the intermediary standoff member is generally cylindrical.

7. The gas turbine engine fuel heat shield of claim 1, wherein the at least one seal is a C-seal.

8. The gas turbine engine fuel heat shield of claim 1, wherein the generally elongated member, the first collar and the second collar are generally cylindrical.

9. A gas turbine engine fuel heat shield, comprising:

a gas turbine engine fuel heat shield body formed from a generally cylindrical, elongated member having a first collar that is generally cylindrical and positioned at a first end and a second collar at a second end opposite to the first end, wherein the first collar extends radially outward beyond outer surfaces of other portions of the gas turbine engine fuel heat shield body;

at least one recess in an outer surface of the generally elongated member between the first collar and the second collar, wherein the at least one recess extends around the generally elongated member;

a sleeve positioned around the generally elongated member and radially outward of the at least one recess to form at least one chamber between the generally elongated member and the sleeve;

a first standoff member in contact with the first collar and positioned between the first collar and the second collar;

wherein the sleeve extends from the first standoff member to the second end at the second collar; and at least one seal in contact with an axial surface at the second end of the generally elongated member, which is at an opposite end from the first collar at the first end, and in contact with the sleeve to seal the sleeve to the generally elongated member within a cavity in a turbine component.

10. The gas turbine engine fuel heat shield of claim 9, wherein the sleeve is sealed to the first standoff member and is sealed to the second collar.

11. The gas turbine engine fuel heat shield of claim 9, further comprising an intermediary standoff member positioned between the first collar and the second collar.

12. The gas turbine engine fuel heat shield of claim 11, wherein the intermediary standoff member is positioned between the first standoff member and the second collar.

13. The gas turbine engine fuel heat shield of claim 9, wherein the at least one seal is a C-seal.

14. A gas turbine engine fuel heat shield, comprising:

a gas turbine engine fuel heat shield body formed from a generally cylindrical, elongated member having a first collar that is generally cylindrical and positioned at a first end and a second collar at a second end opposite to the first end, wherein the first collar extends radially outward beyond outer surfaces of other portions of the gas turbine engine fuel heat shield body;

at least one recess in an outer surface of the generally elongated member between the first collar and the second collar, wherein the at least one recess extends around the generally elongated member;

a sleeve positioned around the generally elongated member and radially outward of the at least one recess to form at least one sealed chamber between the generally elongated member and the sleeve;

a first standoff member in contact with the first collar and positioned between the first collar and the second collar and wherein the sleeve extends from the first standoff member to the second end at the second collar;

wherein the sleeve is sealed to the first standoff member and is sealed to the second collar;

an intermediary standoff member that is generally cylindrical and positioned between the first collar and the second collar;

at least one seal in contact with an axial surface at the second end of the generally elongated member, which is at an opposite end from the first collar at the first end, and in contact with the sleeve to seal the sleeve to the generally elongated member within a cavity in a turbine component; and wherein the first collar is positioned in a countersink in the turbine component.

* * * * *